(12) United States Patent
Zhong et al.

(10) Patent No.: US 8,207,506 B2
(45) Date of Patent: Jun. 26, 2012

(54) NEUTRON DETECTION

(75) Inventors: William J. S. Zhong, Stamford, CT (US); Jack C. Chou, Stamford, CT (US)

(73) Assignee: Nova Scientific, Inc., Sturbridge, MA (US)

( * ) Notice: Subject to any disclaimer, the term of this patent is extended or adjusted under 35 U.S.C. 154(b) by 0 days.

(21) Appl. No.: 12/875,897

(22) Filed: Sep. 3, 2010

(65) Prior Publication Data

US 2011/0133097 A1      Jun. 9, 2011

Related U.S. Application Data

(63) Continuation-in-part of application No. 11/772,960, filed on Jul. 3, 2007, now Pat. No. 7,791,038.

(51) Int. Cl.
  *G01T 3/00* (2006.01)
(52) U.S. Cl. .................................. 250/390.01
(58) Field of Classification Search . 250/390.01–390.12
  See application file for complete search history.

(56) References Cited

U.S. PATENT DOCUMENTS

| | | | |
|---|---|---|---|
| 3,911,167 A | 10/1975 | Linder | 427/87 |
| 4,983,551 A | 1/1991 | Feller et al. | 501/74 |
| 5,015,909 A | 5/1991 | Zhong et al. | 313/105 |
| 5,205,902 A * | 4/1993 | Horton et al. | 216/56 |
| 5,221,646 A | 6/1993 | Blackburn et al. | 501/55 |
| 7,183,701 B2 | 2/2007 | Downing et al. | 313/103 R |
| 7,265,359 B2 | 9/2007 | Ambrosi et al. | 250/390.01 |
| 7,508,131 B2 | 3/2009 | Downing et al. | 313/523 |
| 7,582,880 B2 | 9/2009 | Wallace et al. | 250/390.11 |
| 2003/0178574 A1 | 9/2003 | Wallace et al. | 250/390.11 |
| 2005/0135535 A1* | 6/2005 | Wallace | 376/153 |
| 2005/0136529 A1 | 6/2005 | Yang et al. | 435/287.1 |
| 2005/0205798 A1* | 9/2005 | Downing et al. | 250/390.11 |
| 2007/0132351 A1* | 6/2007 | Downing et al. | 313/103 R |

FOREIGN PATENT DOCUMENTS

EP    1 306 880    5/2003

OTHER PUBLICATIONS

Pellegrin et al., "A Multichannel Nanoparticle Scintillation Microdevice with Integrated Waveguides for Alpha, Beta, Gamma, X-Ray, and Neutron Detection", IEEE, MEMS 2006, Istanbul, Turkey, pp. 682-685, Jan. 22-26, 2006.
"International Search Report", International Application No. PCT/US08/66274, 2 pages, Jan. 12, 2009.
"Written Opinion of the International Searching Authority", International Application No. PCT/US08/66274, 5 pages, Jan. 12, 2009.

* cited by examiner

*Primary Examiner* — Kiho Kim
(74) *Attorney, Agent, or Firm* — Fish & Richardson P.C.

(57) ABSTRACT

An electron multiplier includes a neutron-sensitive composition having silicon oxide, lead oxide, boron-10 enriched boron oxide, and yttrium oxide. The composition is capable of interacting with neutrons to form an electron cascade. The electron multiplier can be in the form of a microchannel plate, a microfiber plate, or a microsphere plate.

21 Claims, 3 Drawing Sheets

NEUTRON DETECTION

CROSS REFERENCE TO RELATED APPLICATIONS

This application is a continuation-in-part of and claims priority to U.S. application Ser. No. 11/772,960, filed Jul. 3, 2007 now U.S. Pat. No. 7,791,038. The above application is incorporated by reference in its entirety.

TECHNICAL FIELD

The invention relates to neutron detection, such as, for example, neutron-sensitive materials, neutron detectors, and methods of detecting neutrons.

BACKGROUND

Neutrons can be detected to detect the presence of special nuclear materials, such as plutonium, or to be used in neutron imaging. An example of a neutron detector is a neutron sensitive microchannel plate (MCP). An MCP can be formed by bonding a glass plate between an input electrode and an output electrode, and providing a high voltage direct current (DC) field between the electrodes. The glass plate is perforated with a substantially regular, parallel array of microscopic channels, e.g., cylindrical and hollow channels. Each channel, which can serve as an independent electron multiplier, has an inner wall surface formed of a semi-conductive and electron emissive layer.

The MCP can be made neutron-sensitive by doping the glass plate with, e.g., boron-10 particles, which can capture neutrons in reactions that generate lithium-7 and alpha particles. As the lithium-7 and alpha particles enter nearby channels and collide against the wall surfaces to produce secondary electrons, a cascade of electrons can be formed as the secondary electrons accelerate along the channels (due to the DC field), and collide against the wall surfaces farther along the channels, thereby increasing the number of secondary electrons. The electron cascades develop along the channels and are amplified into detectable signals that are electronically registered and sometimes processed to construct an image.

SUMMARY

The invention relates to neutron detection, such as, for example, neutron-sensitive materials, neutron detectors, and methods of detecting neutrons.

In one aspect, the invention features an electron multiplier including a neutron-sensitive composition having, in weight percent, approximately 30% to approximately 60% silicon oxide, approximately 20% to approximately 60% lead oxide, and approximately 1% to approximately 15% boron-10 enriched boron oxide. The composition is capable of interacting with neutrons to form an electron cascade.

In another aspect, the invention features a method including contacting a neutron sensitive composition with neutrons, the composition having, in weight percent, approximately 30% to approximately 60% silicon oxide, approximately 20% to approximately 60% lead oxide, and approximately 1% to approximately 15% boron-10 enriched boron oxide; and detecting a signal resulting from the contact of the neutrons with the composition.

In another aspect, the invention features including a glass composition having, in weight percent, approximately 30% to approximately 60% silicon oxide, approximately 20% to approximately 60% lead oxide, and approximately 1% to approximately 15% boron-10 enriched boron oxide.

In another aspect, the invention features a method including intimately combining, in weight percent, approximately 30% to approximately 60% silicon oxide, approximately 20% to approximately 60% lead oxide, and approximately 1% to approximately 15% boron-10 enriched boron oxide, to form a glass; and using the glass to form an electron multiplier and/or to detect neutrons.

Embodiments of the aspects may include one or more of the following features. The composition further includes a non-zero amount of aluminum oxide less than approximately 5 weight percent. The composition further includes a non-zero amount of bismuth oxide less than approximately 5 weight percent. The composition further includes a non-zero amount of calcium oxide less than approximately 5 weight percent. The composition further includes a non-zero amount of cesium oxide less than approximately 8 weight percent. The composition further includes a non-zero amount of magnesium oxide less than approximately 5 weight percent. The composition includes from approximately 2 weight percent to approximately 40 weight percent of barium oxide. The composition further includes a non-zero amount of aluminum oxide less than approximately 5 weight percent, a non-zero amount of arsenic oxide less than approximately 1 weight percent, a non-zero amount of bismuth oxide less than approximately 5 weight percent, a non-zero amount of calcium oxide less than approximately 5 weight percent, a non-zero amount of cesium oxide less than approximately 8 weight percent, a non-zero amount of magnesium oxide less than approximately 5 weight percent, a non-zero amount of rubidium oxide less than approximately 1 weight percent, and a non-zero amount of antimony oxide less than approximately 1 weight percent. The composition includes from approximately 2 weight percent to approximately 40 weight percent of barium oxide.

The electron multiplier can be in the form of a microchannel plate, a microsphere plate, or a microfiber plate.

In another aspect, the invention features an electron multiplier, including a neutron-sensitive composition having, in weight percent, approximately 20% to approximately 40% silicon oxide, approximately 25% to approximately 40% lead oxide, approximately 5% to approximately 10% boron-10 enriched boron oxide, and approximately 4% to approximately 12% gadolinium oxide. The composition is capable of interacting with neutrons to form an electron cascade.

In another aspect, the invention features a method including contacting a neutron sensitive composition with neutrons, the composition having, in weight percent, approximately 20% to approximately 40% silicon oxide, approximately 25% to approximately 40% lead oxide, approximately 5% to approximately 10% boron-10 enriched boron oxide, and approximately 4% to approximately 12% gadolinium oxide; and detecting a signal resulting from the contact of the neutrons with the composition. The composition can include from approximately 2 weight percent to approximately 40 weight percent of barium oxide.

In another aspect, the invention features a glass composition having, in weight percent, approximately 20% to approximately 40% silicon oxide, approximately 25% to approximately 40% lead oxide, approximately 5% to approximately 10% boron-10 enriched boron oxide, and approximately 4% to approximately 12% gadolinium oxide. The composition is capable of interacting with neutrons to form an electron cascade.

In another aspect, the invention features a method including intimately combining, in weight percent, approximately 20% to approximately 40% silicon oxide, approximately 25% to approximately 40% lead oxide, approximately 5% to approximately 10% boron-10 enriched boron oxide, and approximately 4% to approximately 12% gadolinium oxide, to form a glass; and using the glass to form an electron multiplier and/or to detect neutrons.

Embodiments of the aspects may include one or more of the following features. The composition further includes a non-zero amount of aluminum oxide less than approximately 5 weight percent. The composition further includes a non-zero amount of titanium oxide less than approximately 5 weight percent. The composition further includes a non-zero amount of bismuth oxide less than approximately 5 weight percent. The composition further includes a non-zero amount of calcium oxide less than approximately 5 weight percent. The composition further includes a non-zero amount of cesium oxide less than approximately 5 weight percent. The composition includes from approximately 2 weight percent to approximately 10 weight percent of barium oxide. The composition further includes a non zero amount of aluminum oxide less than approximately 5 weight percent, from approximately 2 weight percent to approximately 10 weight percent barium oxide, a non-zero amount of bismuth oxide less than approximately 5 weight percent, a non-zero amount of calcium oxide less than approximately 5 weight percent, a non-zero amount of cesium oxide less than approximately 5 weight percent, a non-zero amount of potassium oxide less than approximately 2 weight percent, a non-zero amount of lithium oxide less than approximately 1 weight percent, a non-zero amount of magnesium oxide less than approximately 1 weight percent, a non-zero amount of sodium oxide less than approximately 2 weight percent, and a non-zero amount of titanium oxide less than approximately 5 weight percent.

The electron multiplier can be in the form of a microchannel plate, a microsphere plate, or a microfiber plate.

The chemical constituents (e.g., atomic species and concentrations) of the compositions (e.g., glasses) described herein can be determined by quantitative elemental analysis of the compositions. The constituents have been expressed as the binary oxides of atomic species, e.g., silicon (Si) is expressed as silicon oxide ($SiO_2$). One skilled in the art would understand that the compositions themselves do not include, for example, $SiO_2$, in its binary form (such as by having the crystal structure of $SiO_2$).

Embodiments may include one or more of the following advantages. The neutron-sensitive compositions have high sensitivities for neutrons to provide detection with high signal to noise ratios. The compositions are sensitive to both thermal neutrons and higher energy neutrons, with the neutron absorption in the detector inversely proportional to energy. In some embodiments, efficiencies of up to approximately 50% can be obtained.

The compositions are stable up to high temperatures. The compositions can be melted, cast, extruded (e.g., into hollow tubing), made into solid fibers, and processed with compatible etchable glasses. The compositions can be formed into MCPs, microfiber plates (MFP5), and microsphere plates (MSPs) using glass processing methods.

Other aspects, features and advantages will be apparent from the description of the embodiments thereof and from the claims.

DETAILED DESCRIPTION

Figure 1:
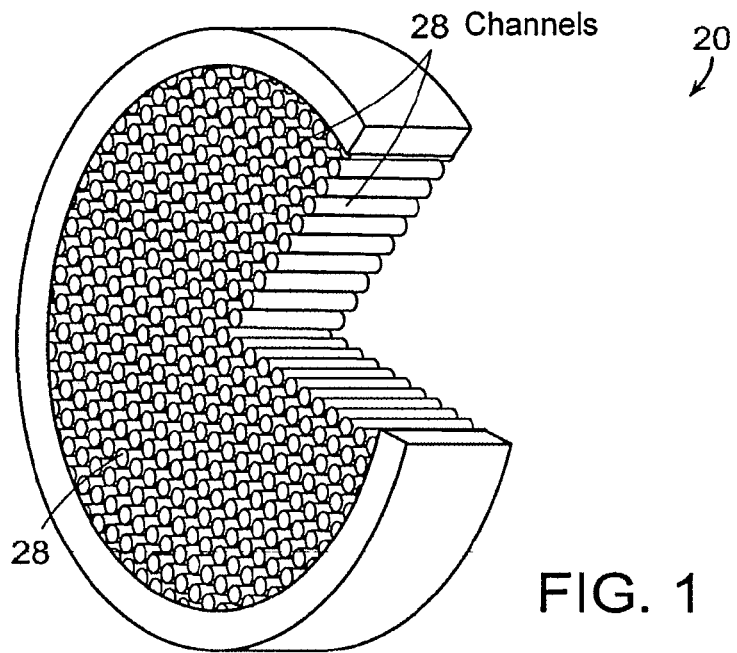
FIG. 1 is a perspective illustration of an embodiment of a microchannel plate.
Figure 2:
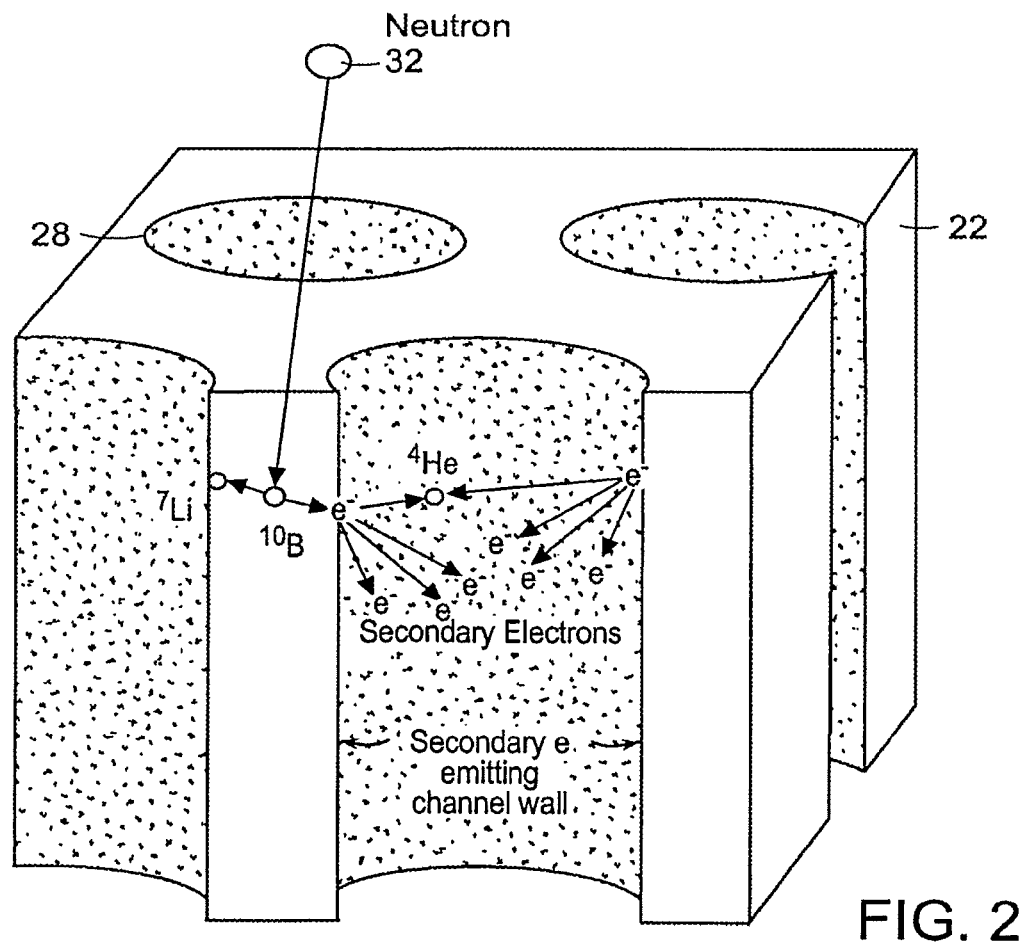
FIG. 2 is a schematic diagram of neutron capture and conversion in a neutron-sensitive MCP.
Figure 3:
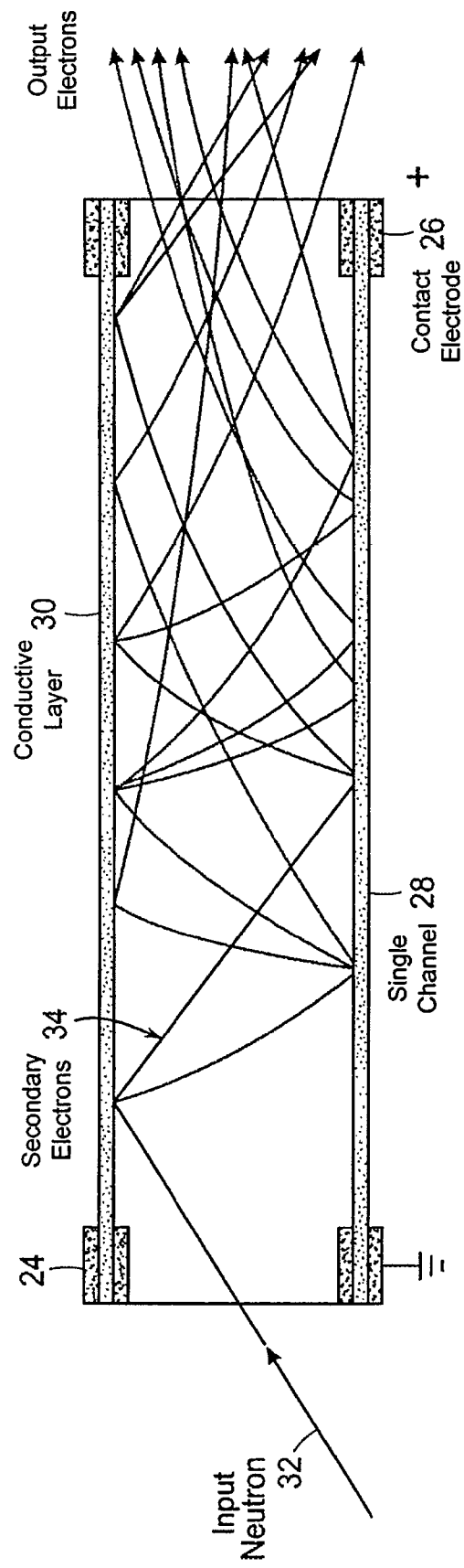
FIG. 3 is a schematic diagram of an embodiment of a microchannel.

Referring to FIGS. 1, 2 and 3, a neutron-sensitive microchannel plate (MCP) 20 includes a glass plate 22 bonded between an input electrode 24 and an output electrode 26. Electrodes 24, 26 are capable of holding a high voltage direct current (DC) field between them. Plate 22 includes a substantially regular, parallel array of microscopic channels 28, e.g., cylindrical and hollow channels. Each channel 28, which can serve as an independent electron multiplier, has an inner wall surface formed of a semi-conductive and electron emissive layer 30. Each channel 28 further includes (e.g., is formed of) one or more neutron sensitive compositions that include boron-10 ($^{10}B$), or boron-10 ($^{10}B$) and gadolinium ($^{155}Gd$, $^{157}Gd$). In some embodiments, lithium-6, which is a neutron absorber used for net detection, can be included (e.g., at approximately 1 wt %).

In operation, when an incident neutron 32 strikes plate 22, the neutron is captured by a boron-10 atom, and an alpha particle ($^4He$) and a lithium-7 particle are released, as in the reaction below:

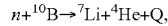

$$n+^{10}B \rightarrow ^7Li+^4He+Q,$$

where Q is the energy released in the reaction. Referring particularly to FIG. 2, one or both of the lithium-7 and helium-4 particles pass out of the glass and enter one or more adjacent channels 28, freeing electrons 34 along the way. Concurrently, a DC bias voltage is applied between electrodes 24, 26 such that output electrode 26 has a more positive DC bias voltage than input electrode 24. The DC bias voltage generates an electric field (e.g., about 1 kV/mm) that attracts free electrons 34 toward output electrode 26. As free electrons 34 strike the channel walls, more electrons are released to form a cascade of electrons that is detected as a signal at output electrode 26. Thus, plate 22 acts as an electron multiplier. The signal is read out and sent to a signal processor, such as a coincidence unit described in U.S. Ser. No. 11/522,795, filed on Sep. 18, 2006, and entitled "Neutron Detection Based on Coincidence Signal".

In addition to using boron-10 to capture neutrons, the neutron-sensitive composition can include gadolinium (Gd) to capture neutrons as in the following reactions:

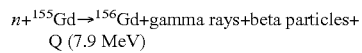

$$n+^{155}Gd \rightarrow ^{156}Gd + \text{gamma rays} + \text{beta particles} + Q\ (7.9\ MeV)$$

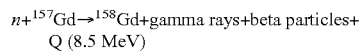

$$n+^{157}Gd \rightarrow ^{158}Gd + \text{gamma rays} + \text{beta particles} + Q\ (8.5\ MeV)$$

The beta particles can generate an electron cascade similarly to the lithium-7 and helium-4 particles described above. Furthermore, when gadolinium atoms capture neutrons, gamma rays (e.g., primarily sub-200 keV gamma rays) are emitted simultaneously and can be detected, as described in U.S. Ser. No. 60/893,484, filed on Mar. 7, 2007, and entitled "Radiation Detectors and Related Methods".

As indicated above, in some embodiments, neutron-sensitive compositions include (e.g., is formed of) a glass including boron-10. The compositions can include as an intimate and homogeneous mixture, in weight percent:

TABLE 1

| Material | Weight Percent |
| --- | --- |
| $Al_2O_3$ | 0-5 |
| $As_2O_3$ | 0-1 |
| $^{10}B_2O_3$ | 1-15 |
| BaO | 2-40 |
| $Bi_2O_3$ | 0-5 |
| CaO | 0-5 |
| $Cs_2O$ | 0-8 |
| MgO | 0-5 |
| PbO | 20-60 |
| $Rb_2O$ | 0-1 |
| $Sb_2O_3$ | 0-1 |
| $SiO_2$ | 30-60 |

In some embodiments, the compositions consist essentially of or consist of the materials listed in Table 1 and described below.

Without wanting to be bound by theory, it is believed that aluminum oxide serves as a secondary glass builder that enhances the stability of the neutron-sensitive compositions and reduces the occurrence of phase separation. For example, aluminum oxide can enhance the durability of the compositions in moist and/or acidic environments, such as during etching. Aluminum oxide can also enhance the chemical stability of the composition while allowing the composition to melt controllably to ease processing of the composition. The concentration of aluminum oxide can range from approximately zero weight percent to approximately 5.0 weight percent. For example, the aluminum oxide concentration can be greater than or equal to, in weight percent, approximately 0%, approximately 0.5%, approximately 1.0%, approximately 1.5%, approximately 2.0%, approximately 2.5%, approximately 3.0%, approximately 3.5%, approximately 4.0%, or approximately 4.5%; and/or less than or equal to approximately 5.0%, approximately 4.5%, approximately 4.0%, approximately 3.5%, approximately 3.0%, approximately 2.5%, approximately 2.0%, approximately 1.5%, approximately 1.0%, or approximately 0.5%.

Arsenic oxide is used as a fining agent during the glass melting process. The concentration of arsenic oxide can range from approximately 0 weight percent to approximately 1 weight percent. For example, the arsenic oxide concentration can be greater than or equal to, in weight percent, approximately 0%, approximately 0.25%, approximately 0.5%, or approximately 0.75%; and/or less than or equal to approximately 1.0%, approximately 0.75%, approximately 0.5%, or approximately 0.25%.

Boron oxide, such as boron-10 enriched boron oxide (approximately 100% boron-10), is used to provide the composition with boron-10 for neutron capture. It is believed that boron oxide can also make the composition easier to melt, thereby enhancing processing. Boron oxide may also lower the thermal expansion of the neutron-sensitive composition, thereby decreasing the occurrence of breakage due to thermal shock. The concentration of boron oxide can range from approximately 1 weight percent to approximately 15 weight percent. For example, the boron oxide concentration can be greater than or equal to, in weight percent, approximately 1%, approximately 2%, approximately 3%, approximately 4%, approximately 5%, approximately 6%, approximately 7%, approximately 8%, approximately 9%, approximately 10%, approximately 11%, approximately 12%, approximately 13%, or approximately 14%; and/or less than or equal to approximately 15%, approximately 14%, approximately 13%, approximately 12%, approximately 11%, approximately 10%, approximately 9%, approximately 8%, approximately 7%, approximately 6%, approximately 5%, approximately 4%, approximately 3%, or approximately 2%.

The alkaline earth oxides (MgO, CaO, and BaO) are used to enhance the stability of the neutron-sensitive compositions. It is believed that these oxides can modify the structure of the compositions (e.g., by filling atomic holes) to enhance stability. The concentration of alkaline earth oxides can range from approximately 2 weight percent to approximately 50 weight percent (such as from approximately 2 weight percent to approximately 30 weight percent). For example, the concentration of alkaline earth oxides can be greater than or equal to, in weight percent, approximately 2%, approximately 5%, approximately 7.5%, approximately 10%, approximately 12.5%, approximately 15%, approximately 17.5%, approximately 20%, approximately 22.5%, approximately 25%, approximately 27.5%, approximately 30%, approximately 32.5%, approximately 35%, approximately 37.5%, approximately 40%, approximately 42.5%, approximately 45%, or approximately 47.5%; and/or less than or equal to approximately 50%, approximately 47.5%, approximately 45%, approximately 42.5%, approximately 40%, approximately 37.5%, approximately 35%, approximately 32.5%, approximately 30%, approximately 27.5%, approximately 25%, approximately 22.5%, approximately 20%, approximately 17.5%, approximately 15%, approximately 12.5%, approximately 10%, approximately 7.5%, or approximately 5%.

More specifically, as indicated in Table 1, the concentrations of calcium oxide and magnesium oxide can each independently range from approximately zero percent to approximately 5 percent, and the concentration of barium oxide can range from approximately 2 percent to approximately 40 percent. The calcium oxide and magnesium oxide concentration can each independently be greater than or equal to, in weight percent, approximately 0%, approximately 0.5%, approximately 1.0%, approximately 1.5%, approximately 2.0%, approximately 2.5%, approximately 3.0%, approximately 3.5%, approximately 4.0%, or approximately 4.5%; and/or less than or equal to approximately 5.0%, approximately 4.5%, approximately 4.0%, approximately 3.5%, approximately 3.0%, approximately 2.5%, approximately 2.0%, approximately 1.5%, approximately 1.0%, or approximately 0.5%. The barium oxide concentration can be greater than or equal to, in weight percent, approximately 2%, approximately 5%, approximately 7.5%, approximately 10%, approximately 12.5%, approximately 15%, approximately 17.5%, approximately 20%, approximately 22.5%, approximately 25%, approximately 27.5%, approximately 30%, approximately 32.5%, approximately 35%, or approximately 37.5%; and/or less than or equal to approximately 40%, approximately 37.5%, approximately 35%, approximately 32.5%, approximately 30%, approximately 27.5%, approximately 25%, approximately 22.5%, approximately 20%, approximately 17.5%, approximately 15%, approximately 12.5%, approximately 10%, approximately 7.5%, or approximately 5%.

Bismuth oxide is used so that the composition can be reduced to form an electronically conductive surface layer. The concentration of bismuth oxide can range from approximately zero weight percent to approximately 5.0 weight percent. For example, the bismuth oxide concentration can be greater than or equal to, in weight percent, approximately 0%, approximately 0.5%, approximately 1.0%, approximately 1.5%, approximately 2.0%, approximately 2.5%, approximately 3.0%, approximately 3.5%, approximately 4.0%, or approximately 4.5%; and/or less than or equal to approximately 5.0%, approximately 4.5%, approximately 4.0%, approximately 3.5%, approximately 3.0%, approximately 2.5%, approximately 2.0%, approximately 1.5%, approximately 1.0%, or approximately 0.5%.

The alkaline oxides ($Cs_2O$ and $Rb_2O$) are used as glass modifiers, e.g., to enhance ease of fabrication, and to provide enhanced secondary electron yield by lowering the surface work function. The concentration of alkaline oxides can range from approximately 0 weight percent to approximately 9 weight percent. For example, the concentration of alkaline earth oxides can be greater than or equal to, in weight percent, approximately 0%, approximately 2%, approximately 4%, approximately 6%, or approximately 8%; and/or less than or equal to approximately 9%, approximately 7%, approximately 5%, approximately 3, or approximately 1%.

More specifically, as indicated in Table 1, the concentrations of cesium oxide can range from approximately zero percent to approximately 8 percent, and the concentration of rubidium oxide can range from approximately 0 percent to approximately 1 percent. The cesium oxide concentration can be greater than or equal to, in weight percent, approximately 0%, approximately 2%, approximately 4%, or approximately 6%; and/or less than or equal to approximately 8%, approximately 6%, approximately 4%, or approximately 2%. The rubidium oxide concentration can be greater than or equal to, in weight percent, approximately 0%, approximately 0.25%, approximately 0.5%, or approximately 0.75%; and/or less than or equal to approximately 1%, approximately 0.75%, approximately 0.5%, or approximately 0.25%.

Lead oxide, similar to bismuth oxide, is used so that the composition can be reduced to form an electronically conductive surface layer. Lead oxide can also serve as a glass former that may allow the compositions to be formed into fibers and a flux. However, because of its high gamma sensitivity, having too much lead oxide can be adverse for neutron detection. The concentration of lead oxide can range from approximately 20 percent to approximately 60 percent. The lead oxide concentration can be greater than or equal to, in weight percent, approximately 20%, approximately 22.5%, approximately 25%, approximately 27.5%, approximately 30%, approximately 32.5%, approximately 35%, approximately 37.5%, approximately 40%, approximately 42.5%, approximately 45%, approximately 47.5%, approximately 50%, approximately 52.5%, approximately 55%, or approximately 57.5%; and/or less than or equal to approximately 60%, approximately 57.5%, approximately 55%, approximately 52.5%, approximately 50%, approximately 47.5%, approximately 45%, approximately 42.5%, approximately 40%, approximately 37.5%, approximately 35%, approximately 32.5%, approximately 30%, approximately 27.5%, approximately 25%, or approximately 22.5%.

Antimony oxide is used as a fining agent during glass melting, similar to arsenic oxide. The concentration of antimony oxide can range from approximately zero weight percent to approximately 1 weight percent. For example, the antimony oxide concentration can be greater than or equal to, in weight percent, approximately 0%, approximately 0.25%, approximately 0.5%, or approximately 0.75%; and/or less than or equal to approximately 1%, approximately 0.75%, approximately 0.5, or approximately 0.25%.

Silicon oxide is the basic former of the neutron-sensitive composition and provides for secondary electron emissions. The concentration of silicon oxide can range from approximately 30 percent to approximately 60 percent. The silicon oxide concentration can be greater than or equal to, in weight percent, approximately 30%, approximately 32.5%, approximately 35%, approximately 37.5% approximately 40%, approximately 42.5%, approximately 45%, approximately 47.5%, approximately 50%, approximately 52.5%, approximately 55%, or approximately 57.5%; and/or less than or equal to approximately 60%, approximately 57.5%, approximately 55%, approximately 52.5%, approximately 50%, approximately 47.5%, approximately 45%, approximately 42.5%, approximately 40%, approximately 37.5%, approximately 35%, or approximately 32.5%. In some embodiments, the concentration of silicon oxide is selected so that the melting temperature of the neutron sensitive composition is less than or equal to approximately 1500 C, which can ease processability of the composition.

Illustrative examples neutron sensitive compositions including boron-10, as well as their softening points, transformation points, thermal expansions, and densities, are provided, in weight percent, in Table 2 below.

TABLE 2

| | Examples (in weight percent) | | | | | | | |
|---|---|---|---|---|---|---|---|---|
| | 2A | 2B | 2C | 2D | 2E | 2F | 2G | 2H |
| $Al_2O_3$ | 1.0 | 1.0 | 0.7 | 0.7 | 0.7 | 0.7 | 0.6 | 0.6 |
| $As_2O_3$ | 0.6 | 0.6 | 0.5 | 0.6 | 0.5 | 0.5 | 0.6 | 0.6 |
| $^{10}B_2O_3$ | 2.6 | 3.0 | 5.4 | 5.4 | 5.5 | 7.5 | 10.0 | 12.1 |
| BaO | 19.0 | 18.4 | 10.0 | 10.0 | 10.2 | 7.3 | 7.8 | 7.3 |
| $Bi_2O_3$ | 2.0 | 2.5 | 2.5 | 2.5 | 2.6 | 2.6 | 2.8 | 2.9 |
| CaO | 2.5 | 2.5 | 2.3 | 2.3 | 2.4 | 2.4 | 2.6 | 2.6 |
| $Cs_2O$ | 3.6 | 3.6 | 4.8 | 3.6 | 2.8 | 4.0 | 4.2 | 3.7 |
| MgO | 1.0 | 1.0 | 1.3 | 1.3 | 1.3 | 1.2 | 1.3 | 1.2 |
| PbO | 29.2 | 29.0 | 33.9 | 34.0 | 34.5 | 34.6 | 31.0 | 31.3 |
| $Rb_2O$ | — | — | — | 0.8 | — | — | — | — |
| $Sb_2O_3$ | 0.4 | 0.4 | 0.5 | 0.5 | 0.5 | 0.5 | 0.6 | 0.5 |
| $SiO_2$ | 38.2 | 38.1 | 38.3 | 38.4 | 39.0 | 38.7 | 38.6 | 38.4 |
| Softening Point, Ts (° C.) | 746 | 742 | 736 | 736 | 735 | 696 | 690 | 685 |
| Glass Transition Temperature, T2 (° C.) | 585 | 582 | 572 | 572 | 580 | 553 | 550 | 546 |
| Lineal Coefficient of Thermal Expansion, a ($\times 10^{-7}$/° C., 50-300° C.) | 78 | 76 | 72 | 72 | 79 | 66 | 62 | 59 |
| Density, p (g/cc) | 3.84 | 3.85 | 3.86 | 3.86 | 3.86 | 3.7 | 3.6 | 3.5 |

As indicated above, in other embodiments, neutron-sensitive compositions can include both boron and gadolinium. The compositions can include as an intimate and homogeneous mixture, in weight percent:

TABLE 3

| Material | Weight Percent |
| --- | --- |
| $Al_2O_3$ | 0-5 |
| $^{10}B_2O_3$ | 5-10 |
| BaO | 2-10 |
| $Bi_2O_3$ | 0-5 |
| CaO | 0-5 |
| $Cs_2O$ | 0-5 |
| $Gd_2O_3$ | 4-12 |
| $K_2O$ | 0-2 |
| $Li_2O$ | 0-1 |
| MgO | 0-1 |
| $Na_2O$ | 0-2 |
| PbO | 25-40 |
| $SiO_2$ | 20-40 |
| $TiO_2$ | 0-5 |

The functions or purposes of the materials in the neutron-sensitive compositions are similar to those described above. In some embodiments, the compositions consist essentially of or consist of the materials listed in Table 3 and described below.

In embodiments in which the boron-and-gadolinium-containing compositions include titanium oxide, aluminum oxide is further believed to work with titanium oxide to strengthen the compositions. The concentration of aluminum oxide can range from approximately zero weight percent to approximately 5 weight percent. For example, the aluminum oxide concentration can be greater than or equal to, in weight percent, approximately 0%, approximately 1%, approximately 2%, approximately 3%, or approximately 4%; and/or less than or equal to approximately 5%, approximately 4%, approximately 3%, approximately 2%, or approximately 1%.

The concentration of boron oxide can range from approximately 5 weight percent to approximately 10 weight percent. For example, the boron oxide concentration can be greater than or equal to, in weight percent, approximately 5%, approximately 5.5%, approximately 6%, approximately 6.5%, approximately 7%, approximately 7.5%, approximately 8%, approximately 8.5%, approximately 9%, or approximately 9.5%; and/or less than or equal to approximately 10%, approximately 9.5%, approximately 9%, approximately 8.5%, approximately 8%, approximately 7.5%, approximately 7%, approximately 6.5%, approximately 6%, or approximately 5.5%.

The concentration of alkaline earth oxides (MgO, CaO, and BaO) can range from approximately 2 weight percent to approximately 16 weight percent For example, the concentration of alkaline earth oxides can be greater than or equal to, in weight percent, approximately 2%, approximately 4%, approximately 6%, approximately 8%, approximately 10%, approximately 12%, or approximately 14%; and/or less than or equal to approximately 16%, approximately 14%, approximately 12%, approximately 10%, approximately 8%, approximately 6%, or approximately 4%. In some embodiments, zinc oxide can be substituted for one or more alkaline earth oxides.

More specifically, as indicated in Table 3, the concentration of magnesium oxide can range from approximately zero percent to approximately 1 percent, the concentration of calcium oxide can range from approximately zero percent to approximately 5 percent, and the concentration of barium oxide can range from approximately 2 percent to approximately 10 percent. The magnesium oxide concentration can be greater than or equal to, in weight percent, approximately 0%, approximately 025%, approximately 0.5%, or approximately 0.75%; and/or less than or equal to approximately 1%, approximately 0.75%, approximately 0.5%, or approximately 0.25%. The calcium oxide concentration can be greater than or equal to, in weight percent, approximately 0%, approximately 0.5%, approximately 1.0%, approximately 1.5%, approximately 2.0%, approximately 2.5%, approximately 3.0%, approximately 3.5%, approximately 4.0%, or approximately 4.5%; and/or less than or equal to approximately 5.0%, approximately 4.5%, approximately 4.0%, approximately 3.5%, approximately 3.0%, approximately 2.5%, approximately 2.0%, approximately 1.5%, approximately 1.0%, or approximately 0.5%. The barium oxide concentration can be greater than or equal to, in weight percent, approximately 2%, approximately 3%, approximately 4%, approximately 5%, approximately 6%, approximately 7%, approximately 8%, or approximately 9%; and/or less than or equal to approximately 10%, approximately 9%, approximately 8%, approximately 7%, approximately 6%, approximately 5%, approximately 4%, or approximately 3%.

The concentration of bismuth oxide can range from approximately zero weight percent to approximately 5.0 weight percent. For example, the bismuth oxide concentration can be greater than or equal to, in weight percent, approximately 0%, approximately 0.5%, approximately 1.0%, approximately 1.5%, approximately 2.0%, approximately 2.5%, approximately 3.0%, approximately 3.5%, approximately 4.0%, or approximately 4.5%; and/or less than or equal to approximately 5.0%, approximately 4.5%, approximately 4.0%, approximately 3.5%, approximately 3.0%, approximately 2.5%, approximately 2.0%, approximately 1.5%, approximately 1.0%, or approximately 0.5%.

The alkaline oxides ($Li_2O$, $Na_2O$, $K_2O$, and $Cs_2O$) can be used to lower the melting temperature of the neutron-sensitive compositions, thereby aiding processability, to dissolve silicon oxide, and to enhance the electronic conductivity of the compositions after reduction. The concentration of alkaline oxides can range from approximately zero weight percent to approximately 10 weight percent. For example, the concentration of alkaline earth oxides can be greater than or equal to, in weight percent, approximately 0%, approximately 1%, approximately 2%, approximately 3%, approximately 4%, approximately 5%, approximately 6%, approximately 7%, approximately 8%, or approximately 9%; and/or less than or equal to approximately 10%, approximately 9%, approximately 8%, approximately 7%, approximately 6%, approximately 5%, approximately 4%, approximately 3%, approximately 2%, or approximately 1%.

More specifically, as indicated in Table 3, the concentration of lithium oxide can range from approximately zero percent to approximately 1 percent, the concentration of sodium oxide can range from approximately zero percent to approximately 2 percent, the concentration of potassium oxide can range from approximately zero percent to approximately 2 percent and the concentration of cesium oxide can range from approximately zero percent to approximately 5 percent. The lithium oxide concentration can be greater than or equal to, in weight percent, approximately 0%, approximately 0.25%, approximately 0.5%, or approximately 0.75%; and/or less than or equal to approximately 1%, approximately 0.75%, approximately 0.5%, or approximately 0.25%. The sodium oxide concentration can be greater than or equal to, in weight percent, approximately 0%, approximately 0.25%, approximately 0.5%, approximately 0.75%, approximately 1%, approximately 1.25%, approximately 1.5%, or approximately 1.75%; and/or less than or equal to approximately 2%, approximately 1.75%, approximately 1.5%, approximately 1.25%, approximately 1%, approximately 0.75%, approximately 0.5%, or approximately 10.25%. The potassium oxide concentration can be greater than or equal to, in weight percent, approximately 0%, approximately 0.25%, approximately 0.5%, approximately 0.75%, approximately 1%, approximately 1.25%, approximately 1.5%, or approximately 1.75%; and/or less than or equal to approximately 2%, approximately 1.75%, approximately 1.5%, approximately 1.25%, approximately 1%, approximately 0.75%, approximately 0.5%, or approximately 10.25%. The cesium oxide concentration can be greater than or equal to, in weight percent, approximately 0%, approximately 0.5%, approximately 1.0%, approximately 1.5%, approximately 2.0%, approximately 2.5%, approximately 3.0%, approximately 3.5%, approximately 4.0%, or approximately 4.5%; and/or less than or equal to approximately 5.0%, approximately 4.5%, approximately 4.0%, approximately 3.5%, approximately 3.0%, approximately 2.5%, approximately 2.0%, approximately 1.5%, approximately 1.0%, or approximately 0.5%.

Like boron oxide, gadolinium oxide is used for neutron capture. In particular, gadolinium is used to detect thermal neutrons, while boron is used to detect neutrons with higher energies. The concentration of gadolinium oxide can range from approximately 4 weight percent to approximately 12 weight percent. For example, the gadolinium oxide concentration can be greater than or equal to, in weight percent, approximately 4%, approximately 4.5%, approximately 5%, approximately 5.5%, approximately 6%, approximately 6.5%, approximately 7%, approximately 7.5%, approximately 8%, approximately 8.5%, approximately 9%, approximately 9.5%, approximately 10%, approximately 10.5%, approximately 11%, or approximately 11.5%; and/or less than or equal to approximately 12%, approximately 11.5%, approximately 11%, approximately 10.5%, approximately 10%, approximately 9.5%, approximately 9%, approximately 8.5%, approximately 8%, approximately 7.5%, approximately 7%, approximately 6.5%, approximately 6%, approximately 5.5%, approximately 5%, or approximately 4.5%.

In some embodiments, any fraction of gadolinium (Z=64) oxide can be replaced with other rare earth oxides, such as erbium oxide and/or neodymium oxide. For example, erbium (Z=68) oxide or neodymium (Z=60) oxide can be used to eliminate or to reduce the amount of gadolinium oxide while retaining other properties, e.g., to form a boron-containing glass but without gadolinium.

The concentration of lead oxide can range from approximately 25 percent to approximately 40 percent. The lead oxide concentration can be greater than or equal to, in weight percent, approximately 25%, approximately 27.5%, approximately 30%, approximately 32.5%, approximately 35%, or approximately 37.5%; and/or less than or equal to approximately 40%, approximately 37.5%, approximately 35%, approximately 32.5%, approximately 30%, or approximately 27.5%.

The concentration of silicon oxide can range from approximately 20 percent to approximately 40 percent. The silicon oxide concentration can be greater than or equal to, in weight percent, approximately 20%, approximately 22.5%, approximately 25%, approximately 27.5%, approximately 30%, approximately 32.5%, approximately 35%, or approximately 37.5%; and/or less than or equal to approximately 40%, approximately 37.5%, approximately 35%, approximately 32.5%, approximately 30%, approximately 27.5%, approximately 25%, or approximately 22.5%. In some embodiments, the concentration of silicon oxide is decreased as much as possible to yield a workable glass so that the concentration to gadolinium oxide can be increased for enhanced neutron sensitivity.

Titanium oxide is used to strengthen the network of the glass and to make the glass more durable. The concentration of titanium oxide can range from approximately zero percent to approximately 5 percent. The titanium oxide concentration can be greater than or equal to, in weight percent, approximately 0%, approximately 0.5%, approximately 1.0%, approximately 1.5%, approximately 2.0%, approximately 2.5%, approximately 3.0%, approximately 3.5%, approximately 4.0%, or approximately 4.5%; and/or less than or equal to approximately 5.0%, approximately 4.5%, approximately 4.0%, approximately 3.5%, approximately 3.0%, approximately 2.5%, approximately 2.0%, approximately 1.5%, approximately 1.0%, or approximately 0.5%. In some embodiments, any percentage from zero to 100 of the titanium oxide can be substituted with zirconium oxide.

Illustrative examples neutron sensitive compositions including boron-10 and gadolinium, as well as some softening points, transformation points, thermal expansions, and densities, are provided, in weight percent, in Table 4 below.

TABLE 4

| | Examples (in weight percent) | | | | | | | |
|---|---|---|---|---|---|---|---|---|
| | 4A | 4B | 4C | 4D | 4E | 4F | 4G | 4H |
| $Al_2O_3$ | 0.00 | 0.00 | 0.00 | 0.00 | 1.5 | 1.6 | 2.5 | 1.4 |
| $^{10}B_2O_3$ | 13 | 11 | 13.5 | 28 | 6.9 | 7.1 | 6.9 | 6.9 |
| BaO | 0.00 | 0.00 | 0.00 | 0.00 | 5.8 | 2.2 | 5.8 | 5.7 |
| $Bi_2O_3$ | 2 | 2 | 2 | 2 | 2.2 | 2.3 | 2.2 | 2.2 |
| CaO | 0.00 | 0.00 | 0.00 | 0.00 | 0.00 | 1.4 | 0.00 | 0.00 |
| $Cs_2O$ | 3.0 | 4.4 | 4 | 3.0 | 2.4 | 2.5 | 2.4 | 2.6 |
| $Gd_2O_3$ | 15.2 | 0.00 | 18 | 20 | 10.2 | 10.5 | 10.2 | 10.2 |
| $K_2O$ | 0.8 | 0.00 | 0.00 | 0.4 | 0.6 | 0.00 | 0.00 | 0.00 |
| $Li_2O$ | 0.00 | 0.00 | 0.00 | 0.00 | 0.00 | 0.3 | 0.00 | 0.00 |
| MgO | 0.00 | 0.00 | 0.00 | 0.00 | 1.1 | 1.2 | 1.0 | 0.00 |
| $Na_2O$ | 0.00 | 0.00 | 0.00 | 0.00 | 0.9 | 0.60 | 0.9 | 1.2 |
| PbO | 32 | 32 | 26 | 30 | 35.7 | 36.7 | 35.6 | 35.4 |
| $SiO_2$ | 20 | 20 | 20 | 7 | 31.6 | 32.5 | 31.6 | 32.2 |
| $TiO_2$ | 0.00 | 0.00 | 0.00 | 0.00 | 1.1 | 1.2 | 1.1 | 2.2 |
| $Er_2O_3$ | 0.00 | 10 | 0.00 | 0.00 | 0.00 | 0.00 | 0.00 | 0.00 |
| Softening Point, Ts (° C.) | | | | | | 682 | — | — | 683 |

TABLE 4-continued

| | Examples (in weight percent) | | | | | | | |
|---|---|---|---|---|---|---|---|---|
| | 4A | 4B | 4C | 4D | 4E | 4F | 4G | 4H |
| Glass Transition Temperature, Tg (° C.) | | | | | 550 | — | — | 555 |
| Lineal Coefficient of Thermal Expansion, a (×$10^{-7}$/° C., 50-300° C.) | | | | | 65.5 | — | — | 63 |
| Density, ρ (g/cc) | | | | | 3.95 | — | — | 4.02 |

In some implementations, a neutron-sensitive glass composition that includes boron-10 and gadolinium can be modified by replacing the gadolinium with yttrium (Y). For example, a type of glass NVB14 that contains boron-10 and gadolinium has been found to be robust during chemical processing, has well-proven performance attributes, and high neutron detection efficiency. The NVB14 glass can be modified by replacing gadolinium with yttrium. Having a single neutron-absorbing element (boron-10) present in a microchannel plate neutron detector may have certain advantages. For example, in certain gamma ray rejection methods used with neutron-sensitive microchannel plates (e.g., as described in U.S. Pat. No. 7,439,519), the prompt gamma ray signature given off by a neutron interacting with either $^{10}$B, Gd, or both, can be used to attain very high gamma background rejection. However, the gamma spectrum from Gd is complex, whereas the gamma spectrum from $^{10}$B includes a single line at 478 keV. This may simplify the task of rejecting gamma rays in ancillary electronics and software algorithms. Moreover, Gd has a lower neutron conversion efficiency to detectable charged particles than $^{10}$B, and due to its larger cross section (49,000 barns for natural Gd as compared with 3840 barns for $^{10}$B), and may shield $^{10}$B somewhat from neutron interactions, effectively lowering the neutron detection efficiency.

Replacing Gd with a non-neutron absorbing element yttrium preserves the good and robust microchannel plate processing characteristics of the NVB 14 glass composition, yet also preserves the high neutron detection sensitivity. This simplifies the prompt gamma ray spectrum emitted when a neutron interacts with a neutron-sensitive material in the microchannel plate.

Compared with the NVb14 glass, the new glass composition has higher silica content and two new ingredients, lithium oxide and yttrium oxide, to make the glass easier to melt and more durable under acid etching. The new glass can match the etchable glass NVE2b that is used for fabricate microchannel plates because the new glass properties are similar to those of the glass NVb14.

The neutron-sensitive glass composition can include, as an intimate and homogeneous mixture, in mole percentage the components in the following table. The table also shows the source material and property ranges.

TABLE 5

| | Range in mol % | Source material | Alternative |
|---|---|---|---|
| Oxide | | | |
| $Al_2O_3$ | 0.5~2.5 | Aluminum hydrooxide | Alumina powder |
| $B_2O_3$ | 10~12 | $_{10}B_2O_3$ | |

TABLE 5-continued

| | Range in mol % | Source material | Alternative |
|---|---|---|---|
| $SiO_2$ | 58~62 | Fine silica sand | |
| $Bi_2O_3$ | 0~1 | >99.5% $Bi_2O_3$ | |
| $Na_2O$ | 0~1 | Soda Ash | |
| $Li_2O$ | 0~2 | $Li_2CO_3$ | Lithium Silicate |
| $Cs_2O$ | 0~2 | $Cs_2CO_3$ | |
| BaO | 2~5 | $BaCO_3$ | $Ba(NO_3)_2$ |
| $TiO_2$ | 2~5 | Titanium Oxide | |
| $Y_2O_3$ | 0.5~3 | Yttrium Oxide | |
| PbO | 15~18 | Red Lead | Lead Oxide |
| $Sb_2O_3$ | 0~0.5 | $Sb_2O_3$ | |
| Properties | | | |
| Transition Temp. | 500~550° C. | | |
| Coefficient of Thermal Expansion (50~300° C.) | 55~60 × $10^{-7}$/° C. | | |
| Softening Temperature | 650~680° C. | | |
| Relative Etchability (NVSb14 as 1.0) | 0.7~0.9 | | |
| Density | 3.6~4.0 | | |

For example, the concentration of aluminum oxide can range from approximately 0.5 to 2.5 weight percent. The concentration of boron oxide can range from approximately 10 to 12 weight percent. The concentration of silicon oxide can range from approximately 58 to 62 weight percent. The concentration of bismuth oxide can range from approximately 0 to 1 weight percent. The concentration of sodium oxide can range from approximately 0 to 1 weight percent. The concentration of lithium oxide can range from approximately 0 to 2 weight percent. The concentration of cesium oxide can range from approximately 0 to 2 weight percent. The concentration of barium oxide can range from approximately 2 to 5 weight percent. The concentration of titanium oxide can range from approximately 2 to 5 weight percent. The concentration of yttrium oxide can range from approximately 0.5 to 3 weight percent. The concentration of lead oxide can range from approximately 15 to 18 weight percent. The concentration of antimony oxide can range from approximately 0 to 0.5 weight percent.

The glass from this series can be melted at 1420° C. or lower, and formed in a cylindrical mold. After annealing, the glass can be extruded to a tubing and drawn into a fiber with NVE2b core glass. A multiple-fiber boule after redrawn can be sliced and etched in an acid solution for making a multichannel plate. The glass is reducible under hydrogen firing.

The neutron-sensitive compositions described herein can be synthesized by conventional glass fabrication techniques. The starting raw materials (e.g., a batch of up to 2.3 kg. of oxides, carbonates, and/or hydroxides) can be mixed within the appropriate batch concentrations and melted using standard practice, e.g., at temperatures greater than 1350° C. (such as 1350° C.-1475° C.) for more than four hours (such as 4-6 hours). When the composition is molten, it can be stirred to enhance homogeneity. The molten composition can be formed into rods, tubes, or boules. The composition can then be reformed (e.g., extruded using a glass extruder), if wanted, at temperatures higher than the softening point of the composition into shapes that can be fiberized. The solid compositions should appear uniformly homogeneous, clear, and with no apparent crystallization or devitrification.

A removable core material (e.g., a glass that is susceptible to chemical etching by an appropriate etching solution) can then be inserted into a neutron-sensitive hollow tubing to form a clad/core glass assembly. In order to produce a fiber preform that can be utilized in manufacturing an electron multiplier (e.g., a microchannel plate), the clad/core glass assembly is drawn into a glass fiber.

For example, to form a glass fiber, the clad/core glass assembly can be slowly fed downwards into a furnace. As the assembly is fed downward, the glass begins a viscous flow to form a cone. The glass can then be drawn downward past the bottom of the furnace to form a rigid glass fiber. The fiber can be continuously drawn off of a viscous cone or cut into sections. The clad/core glass assembly can be fed slowly into the furnace such that the lower end thereof is continuously heated and maintained at a constant temperature. The glass fiber can be drawn off the continuously heated assembly at a continuous rate of speed to form a uniform diameter fiber. Further, the clad tube and the glass core can be fused together so that the fiber consists of a solid center core with a fused outer coating. The center core can be of uniform diameter, as is the outer coating, and the center core can be completely coated with no breaks, cracks or the like. Each fiber can include a glass core whose outer periphery is surrounded by a neutron sensitive glass clad layer.

Several thousand of the fibers can be cut into lengths of single fibers which are then clamped together and then heated and drawn, at an appropriate drawing temperature of the glass in order to form, for example, a hexagonal array. A plurality of hexagonal arrays, each having several thousand single fibers, can be assembled into a multi-assembly. The multi assembly can be fused together in a furnace to maintain the hexagonal configuration within an annular outer ring. The fused multi-assembly can be ultimately cut into individual wafers to form microchannel plates. Subsequently, the wafer can be subjected to further processing to form the microchannels.

Microchannels can be formed by removing the solid core glass. As a result, the clad tube wall remains after the removal of the glass core and defines a pathway for electrons in the form of a chemically and thermally treated channel which is defined within the hollowed out central area of the clad glass. The core glass can be removed by chemically etching the solid core glass, for example, using a dilute acid (such as hydrochloric acid or nitric acid). After etching, the solid clad glass including the neutron-sensitive composition remains to form a microchannel, and to provide mechanical support. In some embodiments, the core glass is completely dissolved by the acid solution, while the clad glass remains essentially unetched. The etchability ratio between the core and neutron-sensitive clad can be selected such that the etchant removes the core while leaving the clad entirely intact. A high etchability ratio is preferred to increase (e.g., maximize) the etching speed of the core glass while reducing (e.g., minimizing) damage to the microchannel walls. Moreover, the clad material should not have any chemical ingredient that tends to deposit after etching that cannot be removed by rinsing.

Examples of measured core:clad etch ratios for two considerably different clad glass compositions are shown in Table 5, using an identical core glass (NVE2b, available from Gyrus ACMI (Stamford, Conn.)) which is dissolved. In some embodiments, the core:clad etch ratio is approximately >100:1, such as approximately >500:1 or approximately 1000:1, to avoid formation of residue deposits and crystals, which could be detrimental to further MCP processing. Deposits and crystals can interfere with the electron gain process, and can also cause positive charging, which can shut down the entire process.

TABLE 5

| Example | Etch Ratio |
|---------|------------|
| 2E      | 285:1      |
| 2G      | 273:1      |
| 4H      | 700:1      |

As an example, Example 4H can be etched as follows. The glass is pre-cleaned by immersion in a micro-detergent for several minutes under ultrasonic agitation, with rinses. To remove the core glass, the glass is etched in 1N nitric acid for several hours at room temperature. The glass is then rinsed. To remove any remaining debris left behind from the acid etch and to remove any remaining diffusion layer lining the inner channel wall so as to leave a pristine channel wall surface, the glass is caustically etched in 1N sodium hydroxide at 80 C for several minutes. The glass is then rinsed. Next, leaching is performed in 0.1N hydrochloric acid for 3-7 minutes at room temperature to remove lead out of the topmost vitreous silica surface layer (e.g., the top 100-200 angstroms) so as to increase (e.g., maximize) secondary electron yield. The glass is then rinsed, cleaned by immersion in isopropyl alcohol for approximately 15 minutes under ultrasonic agitation, and dried.

After etching, the microchannels are reduced, for example, by heat-treating in an atmosphere containing hydrogen at high temperatures, where certain reducible oxides, such as lead oxide, are chemically reduced. Table 6 shows some hydrogen reduction temperatures for exemplary compositions. The exact temperature and soak time in a hot hydrogen atmosphere can determine how well an MCP functions and can vary, depending upon the exact material composition. Table 6 shows some exemplary hydrogen reduction process soak temperatures and soak times that provide stable operation, permit a semiconducting layer to be well formed, and provide good gain and background noise performance. In some embodiments, the operation has a gain stability over an accumulated output charge level of approximately >0.01 coulomb/$cm^2$. The gain can drop by less than, for example, approximately 10%. The background noise can be approximately <1 count/$cm^2$/sec of noise. This reduction process can result in an inner channel wall that is semiconducting (e.g., approximately $10^{12}$ ohms/square to approximately $10^{14}$ ohms/square), so that a small bias or leakage current can flow when high voltage is applied to electrodes on either face of the MCP. A superficial vitreous silica layer, approximately 100-200 Å thick, overlays the semiconducting inner channel wall, and provides the secondary electrons needed to form the electron cascade or avalanche within the hollow channel.

TABLE 6

| Example | Temperature (° C.) |
|---|---|
| 2A | 720 |
| 2B | 715 |
| 2C | 710 |
| 2D | 710 |
| 2E | 710 |
| 2F | 670 |
| 2G | 665 |
| 2H | 665 |
| 4A | 640 |
| 4B | 655 |
| 4C | 640 |
| 4D | 625 |
| 4E | 655 |
| 4F | 650 |
| 4G | 650 |
| 4H | 655 |

Reduction soak time was 4 hours for all examples

While a number of embodiments have been described, the invention is not so limited.

Figure 4:
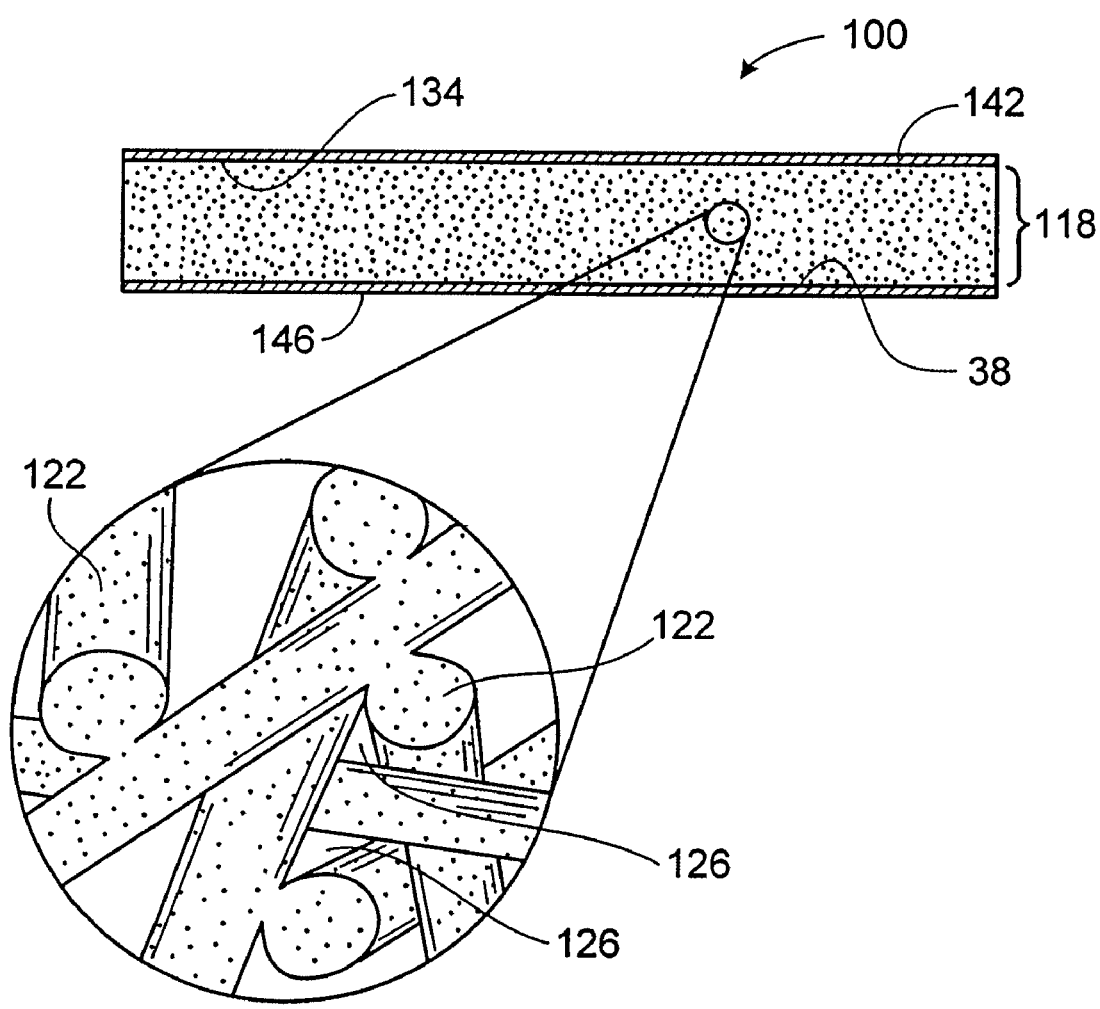
FIG. 4 is a schematic diagram of an embodiment of a microfiber plate.

For example, the neutron-sensitive compositions described herein can be used to form neutron-sensitive microfiber plates (MFP). Referring to FIG. 4, an electron multiplier 100 includes a plate 118 having an input side 134 and an output side 138, an input electrode 142 bonded to the input side, and an output electrode 146 bonded to the output side. Electrodes 142, 146 are configured to provide a DC field (e.g., across plate 118 and generally normal to the electrodes) to accelerate secondary electrons toward output electrode 146. Plate 118 includes (e.g., is formed of) fibers 122 that interconnect to form a complex network structure having interstices or passages 126 that typically extend between electrodes 142, 146. Fibers 122 can include (e.g., is formed of) one or more of the neutron-sensitive compositions described herein. As shown, portions of fibers 122 have been fused to other fibers, for example, by heating the fibers such that areas where the fibers contact each other soften, intermix, and fuse upon cooling. Portions of fibers 122 not fused to other fibers remain exposed, e.g., to a vacuum or ambient atmosphere.

During use, incident particles, such as neutrons, interact and react with fibers 122 within plate 118, e.g., near (but not exclusively) input electrode 142, and produce secondary electrons. The secondary electrons, accelerated toward output electrode 146 by an applied DC field, collide against the surfaces of other fibers as they travel through plate 118, and produce more secondary electrons. As a result, an electron cascade is created, with a relatively large number of electrons exiting plate 118. Other embodiments of MFPs, including fibers of different shapes and aspect ratios, and fibers arranged in a regular pattern (e.g., woven) are described in U.S. Pat. No. 6,828,714.

As another example, the neutron-sensitive compositions described herein can be used to form a neutron-sensitive microsphere plate (MSP). MSPs can include a plate formed of microscopic particles (e.g., spheres) that include the neutron-sensitive compositions described herein. The particles are packed and bonded together, e.g., by compression and/or sintering. As incident neutrons strike against the surfaces of the particles to form secondary electrons, a cascade of electrons can be formed as the secondary electrons accelerate through the interstices defined by the particles and collide against the surfaces of other particles. In some embodiments, the particles include shards, as described in U.S. Pat. No. 6,828,714.

Other embodiments of MFPs, MSPs and MCPs, all of which can include the neutron-sensitive compositions described herein, are described in U.S. Pat. No. 6,828,714; and U.S. Patent Application Publications 2003/0205956, 2004/0256967, and 2005/0205798.

In some embodiments, more than one neutron-sensitive material can be included in a device, e.g., an electron multiplier.

The neutron-sensitive materials described herein can be used in dual gamma and neutron detectors (e.g., in an MCP), as described in U.S. Provisional Patent Application 60/893,484, filed on Mar. 7, 2007.

All references, such as patents, patent applications, and publications, referred to above are incorporated by reference in their entirety.

Still other embodiments are within the scope of the following claims.

What is claimed is:

1. An electron multiplier, comprising:
a neutron-sensitive composition comprising, in weight percent, approximately 58% to approximately 62% silicon oxide, approximately 15% to approximately 18% lead oxide, and approximately 10% to approximately 12% boron-10 enriched boron oxide, the composition capable of interacting with neutrons to form an electron cascade.

2. The electron multiplier of claim 1, wherein the composition further comprises a non-zero amount of yttrium oxide not more than approximately 3 weight percent.

3. The electron multiplier of claim 1, wherein the composition further comprises a non-zero amount of aluminum oxide not more than approximately 2.5 weight percent.

4. The electron multiplier of claim 1, wherein the composition further comprises a non-zero amount of bismuth oxide not more than approximately 1 weight percent.

5. The electron multiplier of claim 1, wherein the composition further comprises a non-zero amount of cesium oxide not more than approximately 2 weight percent.

6. The electron multiplier of claim 1, wherein the composition comprises from approximately 2 weight percent to approximately 5 weight percent of barium oxide.

7. The electron multiplier of claim 1, wherein the composition further comprises a non-zero amount of aluminum oxide not more than approximately 2.5 weight percent, a non-zero amount of bismuth oxide not more than approximately 1 weight percent, a non-zero amount of cesium oxide not more than approximately 2 weight percent, and a non-zero amount of antimony oxide not more than approximately 0.5 weight percent.

8. The electron multiplier of claim 1, in the form of a microchannel plate.

9. The electron multiplier of claim 1, in the form of a microfiber plate.

10. The electron multiplier of claim 1, in the form of a microsphere plate.

11. An electron multiplier, comprising: a neutron-sensitive composition comprising silicon oxide, lead oxide, boron-10 enriched boron oxide, and yttrium oxide, the composition capable of interacting with neutrons to form an electron cascade, in which the yttrium oxide is not more than approximately 3 weight percent.

12. The electron multiplier of claim 11, in the form of a microchannel plate.

13. The electron multiplier of claim 11, in the form of a microfiber plate.

14. The electron multiplier of claim 11, in the form of a microsphere plate.

15. An electron multiplier, comprising: a neutron-sensitive composition comprising silicon oxide, lead oxide, boron-10 enriched boron oxide, and yttrium oxide, the composition capable of interacting with neutrons to form an electron cascade, in which the silicon oxide is approximately 58% to 62% in weight.

16. The electron multiplier of claim 15, in the form of at least one of a microchannel plate, a microfiber plate, or a microsphere plate.

17. An electron multiplier, comprising: a neutron-sensitive composition comprising silicon oxide, lead oxide, boron-10 enriched boron oxide, and yttrium oxide, the composition capable of interacting with neutrons to form an electron cascade, in which the lead oxide is approximately 15% to 18% in weight.

18. The electron multiplier of claim 17, in the form of at least one of a microchannel plate, a microfiber plate, or a microsphere plate.

19. An electron multiplier, comprising: a neutron-sensitive composition comprising silicon oxide, lead oxide, boron-10 enriched boron oxide, and yttrium oxide, the composition capable of interacting with neutrons to form an electron cascade, in which the boron oxide is approximately 10% to 12% in weight.

20. The electron multiplier of claim 19, in the form of at least one of a microchannel plate, a microfiber plate, or a microsphere plate.

21. A method, comprising:
contacting a neutron-sensitive composition with neutrons, the composition comprising silicon oxide, lead oxide, boron-10 enriched boron oxide, and yttrium oxide; and detecting a signal resulting from the contact of the neutrons with the composition, in which the yttrium oxide is not more than approximately 3 weight percent.

* * * * *